US008912252B2

(12) United States Patent
Xu et al.

(10) Patent No.: US 8,912,252 B2
(45) Date of Patent: *Dec. 16, 2014

(54) FILM-FORMING PIGMENTS AND COATING SYSTEM INCLUDING THE SAME

(75) Inventors: Chang Xu, Macungie, PA (US); Hai Hui Lin, Naperville, IL (US); Parfait Jean Marie Likibi, Mount Pleasant, SC (US)

(73) Assignee: Silberline Manufacturing Company, Inc., Tamaqua, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/839,915

(22) Filed: Jul. 20, 2010

(65) Prior Publication Data
US 2012/0022181 A1 Jan. 26, 2012

(51) Int. Cl.
*C09D 151/00* (2006.01)
*C09D 5/02* (2006.01)
*C09D 7/12* (2006.01)
*C09C 1/64* (2006.01)
*C09C 3/10* (2006.01)
C08K 3/08 (2006.01)
C08K 3/22 (2006.01)
C08K 3/34 (2006.01)
C08K 9/08 (2006.01)
C08K 3/00 (2006.01)

(52) U.S. Cl.
CPC .............. *C09D 7/1225* (2013.01); *C09D 5/028* (2013.01); *C08K 3/08* (2013.01); *C08K 3/22* (2013.01); *C09C 1/644* (2013.01); *C08K 3/34* (2013.01); *C09C 3/10* (2013.01); *C08K 9/08* (2013.01); *C08K 3/0033* (2013.01)
USPC ........... 523/213; 428/403; 428/407; 428/457; 204/601; 204/606

(58) Field of Classification Search
USPC .................. 204/601, 606; 428/403, 407, 457; 523/213
See application file for complete search history.

(56) References Cited

U.S. PATENT DOCUMENTS

| 4,359,504 | A | * | 11/1982 | Troy ............................. 428/403 |
| 4,753,829 | A | * | 6/1988 | Panush ....................... 427/385.5 |
| 5,037,475 | A | | 8/1991 | Chida et al. |
| 5,431,956 | A | | 7/1995 | Robb et al. |
| 5,558,705 | A | | 9/1996 | Keemer et al. |
| 5,763,548 | A | | 6/1998 | Matyjaszewski et al. |
| 5,814,686 | A | | 9/1998 | Micale et al. |
| 5,912,283 | A | | 6/1999 | Hashizume et al. |
| 6,022,911 | A | | 2/2000 | Hashizume et al. |
| 6,057,384 | A | | 5/2000 | Nguyen et al. |
| 6,113,683 | A | | 9/2000 | Herren et al. |
| 6,353,107 | B1 | | 3/2002 | Kramer et al. |
| 6,538,047 | B1 | | 3/2003 | Miyabayashi |
| 7,205,362 | B2 | | 4/2007 | Favier et al. |
| 2002/0185378 | A1 | * | 12/2002 | Honeyman et al. ........... 204/601 |
| 2003/0137717 | A1 | * | 7/2003 | Albert et al. ................... 359/296 |
| 2003/0194415 | A1 | | 10/2003 | Wang et al. |
| 2004/0024090 | A1 | | 2/2004 | Suda et al. |
| 2006/0046194 | A1 | | 3/2006 | Hoshi et al. |
| 2006/0156956 | A1 | | 7/2006 | Gane et al. |
| 2007/0298259 | A1 | | 12/2007 | Matsumoto |
| 2008/0022899 | A1 | | 1/2008 | Tsuji et al. |
| 2008/0249209 | A1 | * | 10/2008 | Trummer et al. .............. 523/200 |
| 2008/0257212 | A1 | | 10/2008 | Ganapathiappan |
| 2009/0117281 | A1 | | 5/2009 | Sato et al. |
| 2009/0264575 | A1 | | 10/2009 | Henglein et al. |
| 2011/0130510 | A1 | | 6/2011 | Xu et al. |
| 2012/0022198 | A1 | | 1/2012 | Xu et al. |

FOREIGN PATENT DOCUMENTS

| DE | 10 2008 060 228 | 6/2010 |
| JP | 49-3735 B | 1/1974 |
| JP | 51-33134 | 3/1976 |
| JP | 52-60829 | 5/1977 |
| JP | 53-39328 | 4/1978 |
| JP | 56-501238 | 9/1981 |
| JP | 1-315470 | 12/1989 |
| JP | 05-508430 | 11/1993 |
| JP | 06-49109 | 2/1994 |
| JP | 2000-044835 | 2/2000 |
| JP | 2001-098206 | 4/2001 |
| JP | 2008-31349 | 2/2008 |
| JP | 2010-043224 | 2/2010 |
| JP | 2010-254934 | 11/2010 |
| RU | 2134705 | 8/1999 |

(Continued)

OTHER PUBLICATIONS

Printout from Thomson World Patents Index, Database WPI, Week 201023, Thomson Scientific, London, GB; AN2010-D43671, XP002660080 (4 pages).

(Continued)

*Primary Examiner* — Hannah Pak
(74) *Attorney, Agent, or Firm* — Hamre, Schumann, Mueller & Larson, P.C.

(57) ABSTRACT

A coated pigment that includes polymer encapsulations which act as a pigment dispersant and film forming agent, coating systems that include the coated pigment and methods for producing the coated pigment and the coating system are described. The polymer encapsulations of the coated pigments allow the coated pigments that are included in the coating system to be dispersed without the addition of any other dispersants and/or resins. Thus, the disclosed coated pigments simplify the process of making coating systems. The disclosed coated pigments also extend the shelf-life of the coating systems, and provide a final coating with enhanced pigment orientation and aesthetics.

17 Claims, 4 Drawing Sheets

(56) References Cited

FOREIGN PATENT DOCUMENTS

| | | |
|---|---|---|
| RU | 2261260 | 9/2005 |
| RU | 2008126947 | 1/2010 |
| WO | WO 81/00826 | 4/1981 |
| WO | 91/04293 | 4/1991 |
| WO | WO 91/18951 | 12/1991 |
| WO | 01/92359 | 12/2001 |
| WO | 2010/032654 | 3/2010 |
| WO | 2010/066785 | 6/2010 |

OTHER PUBLICATIONS

Organic Coatings: Science and Technology, $3^{rd}$ edition (New York: John Wiley & Sons), p. 440-446 (2007).

* cited by examiner

FILM-FORMING PIGMENTS AND COATING SYSTEM INCLUDING THE SAME

FIELD

This disclosure relates generally to coated pigments and coating systems including the coated pigments, and particularly, to the design of polymer coated pigments and methods of producing the coated pigments, and to the design of coating systems including the coated pigments.

BACKGROUND

Pigments, resins, and solvents are major components of pigmented paints and inks. While resins are mainly responsible for the film formation and adhesion between coatings and substrates, pigments are widely used in paint/ink industries to impart aesthetic effects or protective functions to the coated substrates. The properties of pigmented paint/inks and the performances of the final coating are greatly affected by the dispersion of the pigments and their interaction with resin, solvent, and other components of the paints/inks. However, due to the complicated interactions among these ingredients, proper dispersion of pigments in their vehicles and optimal characteristics of the paints/inks are desirable.

Incorporation of pigments into inks and coatings is typically achieved by dispersing dry pigments into liquid resin systems. In order to achieve optimum hiding power or color strength, extensive shear has to be applied during the mixing process to break the pigment agglomerates or aggregates down into primary particles. The pigment particles also need to be stable in the paint/ink system during the storage as re-aggregation of the pigment particles or separation of pigment from the bulk of paint/ink system will reduce the performance of the paint/ink system.

The addition of pigment to the paint/ink system often has complicated implication to the performance of paint/ink systems. For example, the interaction between pigment surfaces and resin polymer chains can alter the viscosity profiles of the ink/paint systems. Depending on their application conditions, paints or inks have their distinctive preferred rheology profiles. The viscosity of the paint/ink products depends greatly not only on the size, shape, concentration, and dispersion of pigment particles, but also on the interactions between pigment particles and other components of the resin systems. On the other hand, incompatibility between resin and pigments often results in flocculation and separation of pigments from the resin systems, reducing the hiding power and aesthetics of the final coatings.

The interactions between pigments and other paint/ink ingredients are complex, and extensive efforts are required to understand these interactions and how these interactions affect the properties and performances of the final products. For these purposes, dispersants have been extensively used in coating formulations to help the dispersion of pigments and extend shelf life of the resulting paints/inks. Numerous pigment pre-treatment methods have been utilized to increase the pigment compatibility in the resin system and to improve pigment dispersion, control system viscosity, and maintain stability of the paint/ink systems. The surface of the pigment can be treated with surface active reagents that can be either physically absorbed onto the pigment surfaces or chemically bonded to the pigment surfaces. Examples of such surface active reagents include fatty acids, organophosphorous compounds, and silane coupling reagents. Polymeric materials that contain surface active groups also have been extensively studied as pigment dispersants. Research also has been conducted to encapsulate pigments into polymer or inorganic matrixes to improve their dispersion in paint/ink systems.

Pigments can react and/or interact with other ingredients of the paints/inks. In these cases, to increase storage stability and to enhance the final performance of paints/inks, it is desirable to separate these ingredients from one another and mix them together only immediately prior to the application of the paints/inks. However, due to the complex nature of these coating materials, commercial paints/inks are generally supplied as finished products with all ingredients and processed to their final application form by their manufactures. Therefore, despite extensive efforts to mitigate the undesirable reactions and interactions among different ingredients, commercial paints/inks generally have limited shelf-lives. For example, aluminum pigments, which are widely used in paint/ink industries to generate metallic effects, can readily react with water and liberate hydrogen gas. Not only will the erosion of aluminum reduce the metallic luster of the final coating, excessive hydrogen buildup inside the container will impose great hazards during storage, shipping, and handling. With current industrial focus shifts from solvent-borne to water-borne to minimize volatile organic contents (VOC), extensive industrial efforts have been diverted to mitigate the reaction between aluminum pigments and water and to elongate the shelf-stability of the final products.

The interaction between pigment and other coating components also affect the final coating properties such as adhesion, weathering, chemical resistance, and aesthetics. For example, pigments tend to migrate to the surface of coating if they are incompatible with the resin matrix. In these cases, pigments have less adhesion to the film and are exposed to the external environments. As a result, the final coating will have limited scratch resistance and be prone to discoloration.

Therefore, due to the complex interactions between pigments and the rest of the paint/ink systems, extensive considerations have to be made during the paint/ink formulation processes. For instance, depending on the compatibility of the pigments and the rest of the paint/ink systems, extensive research would be needed to identify suitable additives and to develop proper processes to achieve the desirable properties of the paint/inks.

SUMMARY

A coated pigment that includes polymer encapsulations which act as a pigment dispersant and film forming agent, coating systems that include the coated pigment and methods for producing the coated pigment and the coating system are described. The polymer encapsulations of the coated pigments allow the coated pigments that are included in the coating system to be dispersed with or without the addition of any other dispersants and/or resins. Thus, the disclosed coated pigments can simplify the process of making coating systems. The disclosed coated pigments also extend the shelf-life of the coating systems, and provide a final coating with enhanced pigment orientation and aesthetics.

The disclosed coated pigments include polymer chains or polymer networks that are attached to the pigment surfaces. In one embodiment of the disclosed coating system, the coating system includes the disclosed coated pigments and a solvent. In one example, once a suitable solvent is added to the coated pigments, the attached polymer chains or polymer networks swell and the coated pigments become readily dispersed into the solvent. The swollen polymer chains or polymer networks provide steric hindrance and/or electrostatic repulsion, and serve as dispersants to stabilize the coated pigments in the final paint/ink system. Unlike conventional dispersants whose affinity to the pigment surfaces are greatly influenced by the solution environments, the attached polymer chains of the disclosed coated pigments provide robust stabilization for the dispersion, and allow expanded formulation windows for the paint and ink systems.

In another embodiment of the coated pigment, polymers or polymer networks are included in amount sufficient to provide film forming capabilities. Conventional paints rely on an external resin or binder for the film formation. In these conventional systems, a sufficient amount of binder is needed to wet the pigments and the amount of pigment used needs to be low enough to keep the pigment volume concentration (PVC) below a critical PVC. In one example of the disclosed system, paints or inks are directly formed via dispersing polymer encapsulated pigments into a solvent without the addition of external resins. Upon the evaporation of solvents and other volatile contents, the attached polymer on the surfaces of the pigments directly adhere the pigment to one another. This results in a film formation and promotion of the adhesion between the coating and the substrate that is being coated.

In one embodiment of the disclosed coating system, the disclosed coating system simplifies the paint/ink preparation process by not requiring the use of an external binder, grinding aid and dispersants in the paint formulation. In this instance, paints/inks can be made simply by adding a solvent to the disclosed coated pigments with minimal shearing and stirring. Through simplifying the paint/ink composition and reducing processing requirements, the likelihood of undesirable interactions is decreased and the shelf-life of the resulting paint/ink can be extended. In addition, since polymers are chemically bonded to the pigments and the amount of grafted polymer required to achieve good film forming capabilities is small, high pigment loading can be achieved in the final coating. Compared with conventional coatings, the disclosed system including the disclosed coated pigments with pigments that are aluminum, glass and mica flakes, results in coatings that can achieve improved pigment orientation and enhanced aesthetics.

DETAILED DESCRIPTION

Figure 1:
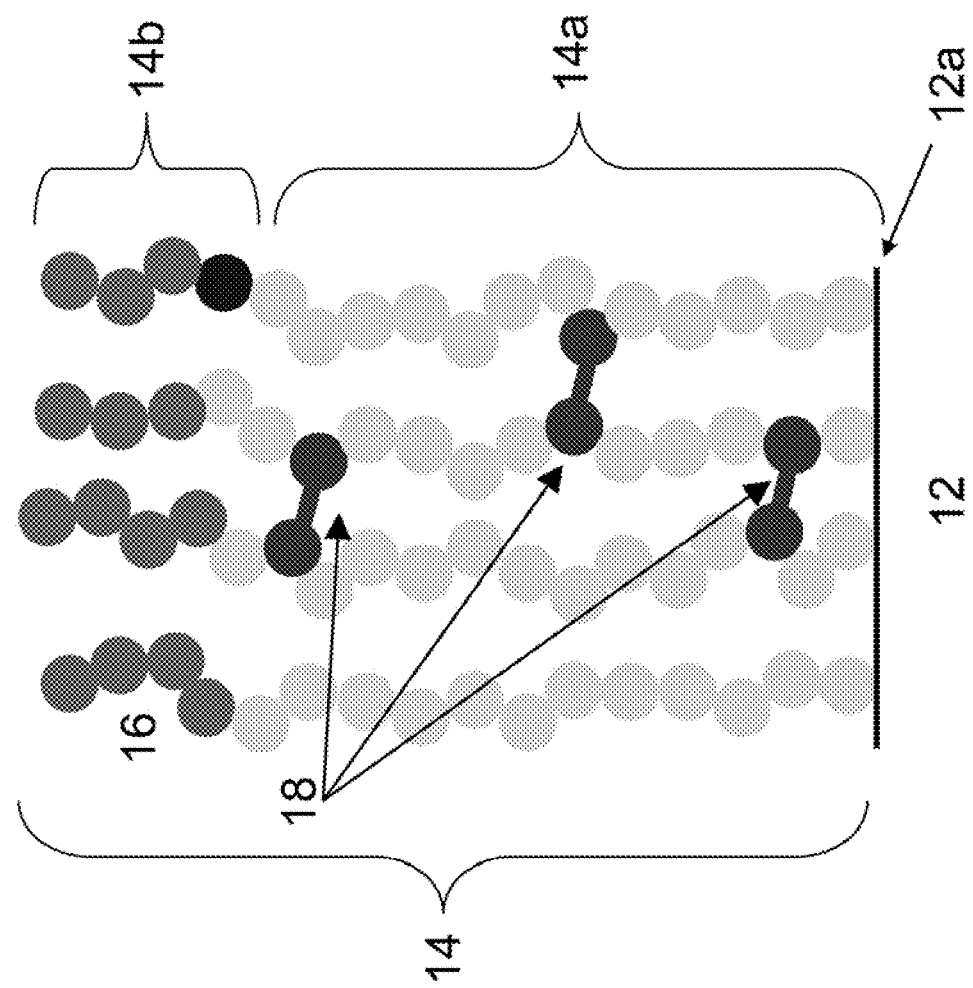
FIG. 1 illustrates one embodiment of the disclosed coated pigment.

A coated pigment that has polymers that are dispersants and film forming reagents attached to the pigment, a coating system that includes the coated pigment, and a method for producing the coating system are described. The concepts of the coating system described herein will be described with respect to a paint or ink system. However, in appropriate circumstances, it is to be realized that the concepts can be applied to other types of systems as well.

Resins and pigments are usually key components in coating systems such as paint/ink systems. The term "resins" herein means polymers that are commonly added in the art as dispersing, film forming and/or adhesive agents to coating formulations such as inks and paints. Resins can be, for example, alkyd, polyester, polyamide, polyimide, silicone, phenolic, urea, melamine, epoxy, polyurethane, polyolefines, polyvinyl, and polyacrylic resins. The term "pigments" herein means transparent, metallic, white or colored, mineral or organic particles of any form, which are insoluble in a liquid medium and are suitable for use in ink and paint compositions. Resins, as film forming reagents, are responsible for the mechanical properties of a coating system and adhesion of the film formed by the coating system to the substrates. The pigments provide hiding power and impart aesthetics to the coating. The inventors have found that by attaching polymers that are dispersants and film forming agents to pigments, a coating system that includes such a coated pigment does not require any additional components other than a solvent to disperse the pigments and form a film that has good adhesion to the substrate.

In one embodiment, the disclosed coating system is a resin-less system. The term "resin-less" means that besides the polymers or polymer networks that are grafted on the surface of the pigments, no additional dispersants and/or resins are required in the final paint/ink formulation for formation of the coating film. The term "additional dispersants and/or resins" herein means polymers that are separate from the polymer chains that are attached to the surface of the pigment, and are commonly added in the art as dispersing, film forming and/or adhesive agents to coating formulations such as inks and paints. The additional resins, for example, can be alkyd, polyester, polyamide, polyimide, silicone, phenolic, urea, melamine, epoxy, polyurethane, polyolefines, polyvinyl, and polyacrylic resins. Examples of the additional dispersants can be found in Organic coatings: science and technology, third edition (New York: John Wiley & Sons, 2007), pages 440 and 446, which is incorporated herein by reference.

In one example, the disclosed coating system includes the disclosed coated pigments and a solvent or a solvent mixture. The term "solvent or a solvent mixture" herein means a liquid that carries the components of the final coating so they can be applied to a substrate and then is removed by evaporation, treating, etc. In one example, the disclosed coating system includes the coated pigments and the solvent or the solvent mixture only. In one implementation, the polymers are added in an amount sufficient to form a film and adhere the film to a substrate when the coating system is applied onto the substrate. The substrate to which the coating system is applied can be any substrate to which paints or inks are applied, including, but not limited to, plastic, metal, etc.

In another embodiment, the disclosed coating system includes coated pigments that are encapsulated with smooth and robust polymer coating of controlled thickness. To obtain stable coated pigment dispersions, the polymer chains or networks are adhered to the surface of the pigment under process conditions. The polymer encapsulation can be stabilized through chemical bonds between polymer chains/networks and the pigments. In one implementation, the polymer encapsulation is composed of polymer chains, where the polymer chains have one end covalently bonded or strongly adsorbed to the surface of a pigment.

One example of the disclosed coated pigment will now be described. With reference to FIG. 1, a coated pigment 10 includes a pigment 12 having a surface 12a. The surface 12a is coated with a coating 14 that has multiple layers 14a, 14b. In the illustrated embodiment shown in FIG. 1, the coating 14 includes two layers 14a, 14b, but in appropriate circumstances, the coating 14 can have one layer or more than two layers. Each of the layers 14a, 14b includes polymer chains 16. The composition of the polymer chains 16 in each of the layers may be the same or different. The polymer chains 16 are strongly attached to the surface 12a of the pigment 12. The term "attached" means that the polymer chains 16 are chemically or physically adhered to the surface 12a of the pigment 12. The coating 14 can also include inter-chain cross-links 18 that link the polymer chains 16.

The pigment can be, but is not limited to, metal oxides, metal oxide encapsulated materials, silica, borosilica, silica coated materials, mica, glass, iron or aluminum. In one example, the coated pigment 10 utilized includes a pigment having a thickness in a range from 0.5 nm to 500 µm. In another example, the thickness of the pigment is in a range from 20 nm to 100 µm. In yet another example, the thickness of the pigment is in a range from 50 nm to 1 µm. In yet another example, the size of the pigment is in a range from 100 nm to 5000 µm. In yet another example, the size of the pigment is in a range from 500 nm to 100 µm. In yet another example, the size of the pigment is in a range from 1 µm to 50 µm.

The strong interactions between the polymer chains 16 and the surface 12a of the pigment 12 provide robustness and stability of the coating. The term "robustness and stability of the coating" herein means the survivability of coated pigments under circulation test, chemical resistance and other process conditions.

Moreover, uneven coating on the pigments surface will disrupt orientation of the pigments and result in poor aesthetic performance. On the other hand, the surfaces of the disclosed coated pigment 10 are smooth so as to allow maximal contact among a plurality of coated pigments 10 and good film formation.

In general, the disclosed coating system includes a plurality of the coated pigments 10 and there are several steps involved in the manufacture of the disclosed coating system. First, pigments are encapsulated with polymers. In one example, the polymer encapsulated pigments can be easily dispersed in solvents. The polymer encapsulated pigments are kept in wet form and stored, for example, as concentrated pastes or slurry. Additional solvent can be added at any time to achieve desired coated pigment concentration prior to the application of the coating system. When the coating system is applied onto a substrate, the solvent evaporates so as to form a film. In one example, the thickness of the film that is formed on the substrate is between 1 and 10 µm. In another example, the thickness of the film that is formed on the substrate is between 2.5 and 3 µm. In yet another example, the thickness of the film that is formed on the substrate is 2.5 µm. Good adhesion between the film and the substrate is achieved by physical or chemical interactions between the polymers included in the coated pigments and the substrate. While the entanglement among polymer chains grafted from different coated pigments can result in good film mechanical properties, the polymer chains can be further modified with functional groups and allow the formation of cross-linked networks on the pigments.

In one embodiment, surface-initiated polymerization is used to fabricate a thick polymer coating on the pigment. In this process, initiator moieties, which are defined as functional groups that can initiate polymerization of polymerizable monomers, are first immobilized on the surfaces of the pigments. Then, with subsequent polymerization, thick polymer chains can be grown from the surfaces of the pigment.

The coating thickness can be readily controlled simply by varying the reaction time. In addition, other factors including, but not limited to, monomer concentration, polymerization time, solvent, and catalyst can be used to control the thickness of the coating as well. The average polymer coating thickness, which can be measured by direct observation via transmission electron microscopy, ranges from a few nanometers to more than 100 nm.

Two factors, grafting density and average molecular weight of polymer chains, also determine coating thickness. The molecular weight of the polymer chains can be adjusted by tuning the polymerization conditions such as polymerization time, monomer concentration, solvent, reaction temperature, and catalysts. Varying the grafting density can be achieved by controlling the initiator area density on the surfaces of the platelets. Using controlled/living radical polymerization, such as atom transfer radical polymerization (U.S. Pat. No. 5,763,548), nitroxide mediated polymerization (U.S. Pat. No. 6,353,107), and reversible addition—fragmentation chain transfer polymerization (U.S. Pat. No. 7,205,362), polymer chains can be grown at similar rates from surfaces, thereby leading to a coating with a uniform structure on the surface of the substrates.

Moreover, by eliminating unbounded initiators in solution, most polymer chains formed are anchored to platelet surfaces. As a result, there are minimal amounts of unbounded polymer chains in solution. The polymerization mixture retains low viscosity throughout the reaction process with or without the addition of solvent. Simple purification procedures can readily separate polymer encapsulated platelets from the other components in the reaction solution.

In one example, a coupling reagent that includes an initiator is used to functionalize pigment surfaces with initiator moieties. The initiator has a chemical structure X—R—Y, where X denotes a surface active group, Y denotes an initiator moiety, and R denotes a spacer. The initiator moieties are anchored to the pigment upon the reaction between surface active groups and functional groups that are present on surfaces of the pigments.

In another example, an initiator can be immobilized on pigment surfaces through a multiple step process. In one instance, the multiple step process is a two-step process. In this instance, a surface active molecule, X-R1-A, is first applied to the surface of a pigment. While functional group X immobilizes the molecules to the surfaces, functional group A allows further chemical reactions on pigment surfaces and leads to the initiator moiety, Y, to be on the surfaces of the pigment.

The surface active group X can be, but is not limited to, mono-, di-, and tri-alkoxylsilanes, mono-, di- and tri-halosilanes, carboxylic acid, phosphonic acid and other chemical groups that have strong affinity to metal, metal oxide or silica surfaces. In case of trialkoxysilane and trihalosilane, the intermolecular condensation among organosilane molecules leads to the formation of high density robust coating of such molecules. In some instances, the selection of X is dependent upon the type of pigment utilized. For example, silanes are used to modify the surface of silica, alumina, and glass, while molecules with carboxylic acid are used to functionalize surfaces of iron oxide.

The initiator moiety Y can be any functional group that initiates controlled radical polymerization. The initiator moiety Y can be, but is not limited to, an activated halogen atom, alkoxyamine, dithioester, dithiocarbamates, trithiocarbonates and xanthates, organic peroxides, and azo compounds.

A variety of polymerization methods, such as radical polymerization, controlled radical polymerization, anionic polymerization, and cationic polymerization, have been used to grow polymer encapsulation from surfaces. In one implementation, controlled radical polymerizations are used to grow polymer chains with controlled structures from surfaces. In one example of the coated pigment, the polymeric chains can include homopolymers, random copolymers, gradient copolymers, block polymers, grafted copolymers, star copolymers or any combination thereof. In one implementation, the polymer chains include cross-links to form a polymer network coating on the pigment.

In one example, after the initiator is immobilized on the surface of the platelet, the platelet is purified via filtration to remove any unbounded coupling reagents before proceeding to the polymerization reaction. In another example where the existence of free coupling reagent in solution does not significantly increase the solution viscosity or adversely alter other process conditions in the following polymerization, the reaction solution is used directly without further purification.

The initiator-immobilized platelets then are dispersed in a monomer solution. The monomer solution can include one type of monomer or mixtures of different types of monomers. Examples of monomers that can be used include, but is not limited to, styrenes, (meth)acrylates, (meth)acrylamides, (meth)acrylic acids, acrylonitrile, vinylpyridines, maleimides, vinyl acetate, vinyl chloride, vinylidene chloride and isoprene. Following dispersion of the initiator immobilized platelets into the monomer solution, polymerization from surfaces lead to the formation of polymer chains that are attached to the platelet. Because of its small size, initiator molecules can be immobilized on the surface of the platelet with high area density. Therefore, this approach allows the synthesis of polymer coatings with high grafting density.

As polymerization from the surface of the platelet follows the same mechanism as solution polymerization, monomers that can be polymerized in solution polymerization can be directly adopted into the disclosed method.

Figure 4:
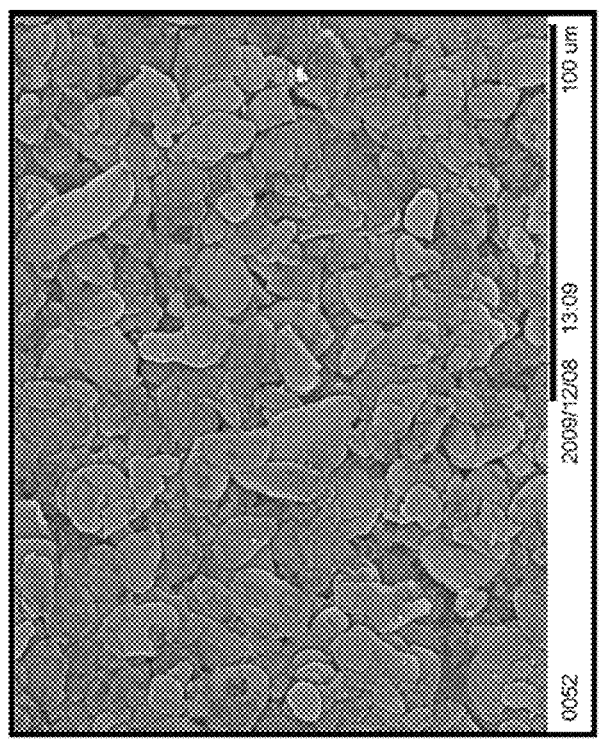
FIG. 4 shows the scanning electron microscopy graph of the surface of the resin-less coating of poly(methyl methacrylate) coated Silberline Sparkle Silver® Premium 695 on poly(methyl methacrylate) panel.

Living or controlled radical polymerization, such as atom transfer radical polymerization, nitroxide mediated polymerization, and reversible addition—fragmentation chain transfer polymerization, allows synthesis of polymers with controlled molecular weight, polydispersity, and architectures from many different types of monomers. By using living polymerization, the disclosed method allows the thickness of the coating to be controlled from a few nanometers up to hundreds of nanometers and further allows the structure of polymer coating on platelets to be controlled. Transmission electron microscopy is used to directly observe the coating thickness and uniformity on particle or platelet surfaces. In this instance, the average and standard deviation of coating thickness can be calculated from transmission electron microscope pictures from more than 10 different coated platelets at a magnification between ×20,000 and ×100,000. As shown in FIG. 4, the standard deviation of the coating thickness on the platelets varies less than 15% of the average coating thickness, where the scale bar is 100 nm.

The living nature of the controlled radial polymerization used in the disclosed method also enables the synthesis of a multilayered coating on the platelet. In one example, a second monomer or a second set of monomers can be added to the reaction flask after a predetermined reaction time. In another example, after the end of the first polymerization, the platelets can be separated from the reaction mixtures, purified, and then subjected to a second polymerization with a second monomer or second set of monomers. In both cases, a second layer of coating can be formed with a composition that is different from that of the first layer. In the latter approach, the method allows the synthesis of a second layer with a completely different composition. The above steps can be repeated any number of times and in any different combinations to provide a multilayered coating.

The encapsulation can be composed of chains or networks of polymer or copolymers of a variety of monomers. Examples of monomers that can be used in the disclosed method include, but are not limited to, acrylonitrile, styrene, divinylbenzene, 4-methylstyrene, 3-methylstyrene, 2-methylstyrene, 4-vinylanisole, 4-fluorostyrene, 2-fluorostyrene, 3-fluorostyrene, 4-chloromethylstyrene, 4-(tert-butyl)styrene, 3-chlorostyrene, methyl methacrylate, methyl acrylate, ethyl methacrylate, ethyl acrylate, n-propyl acrylate, n-propyl methacrylate, iso-propyl methacrylate, iso-propyl acrylate, n-butyl acrylate, n-butyl methacrylate, sec-butyl acrylate, sec-butyl methacrylate, tert-butyl acrylate, tert-butyl methacrylate, tert-amyl methacrylate, n-hexyl acrylate, n-octyl methacrylate, 2-ethylhexyl acrylate, n-decyl methacrylate, iso-decyl acrylate, iso-decyl methacrylate, undecyl methacrylate, n-dodecyl acrylate, n-dodecyl methacrylate, 1-hexadecyl methacrylate, stearyl acrylate, stearyl methacrylate, cyclohexyl acrylate, cyclohexyl methacrylate, 3,3,5-trimethylcyclohexyl methacrylate, benzyl acrylate, benzyl methacrylate, pentabromophenyl acrylate, pentabromophenyl methacrylate, pentafluorophenyl acrylate, pentafluorophenyl methacrylate, phenyl acrylate, phenyl methacrylate, 1,1,1,3,3,3-hexafluoroisopropyl acrylate, 1H,1H,2H,2H-heptadecafluorodecyl acrylate, 1H,1H,2H,2H-heptadecafluorodecyl methacrylate, 1H,1H,3H-hexafluorobutyl acrylate, 1H,1H,3H-hexafluorobutyl methacrylate, 1H,1H,3H-tetrafluoropropyl methacrylate, 1H,1H,5H-octafluoropentyl acrylate, 1H,1H,5H-octafluoropentyl methacrylate, 1H,1H,7H-dodecafluoroheptyl methacrylate, 1H,1H-heptafluorobutyl acrylate, 2,2,2-trifluoroethyl acrylate, 2,2,2-trifluoroethyl methacrylate, hexafluoro-iso-propyl methacrylate, pentafluorophenyl acrylate, pentafluorophenyl methacrylate, methacrylamide, acrylamides, 4-vinyl pyridine, N,N-dimethylaminoethyl methacrylate, N,N-diethylaminoethyl methacrylate, glycidyl methacrylate, 2-hydroxyethyl acrylate, and 2-hydroxyethyl methacrylate, glycidyl acrylate, 4-vinylaniline, 3-vinylaniline, N-iso-propylacrylamide, N,N-diethylacrylamide, N,N-dimethylacrylamide, poly(ethylene glycol) methacrylate, poly(ethylene glycol) acrylate, poly(ethylene glycol) methyl ether methacrylate, poly(ethylene glycol) ethyl ether methacrylate, poly(ethylene glycol) methyl ether acrylate, 1,10-decanediol dimethacrylate, 1,3-butanediol dimethacrylate, 1,4-butanediol diacrylate, 1,4-butanediol dimethacrylate, 1,4-diacryloylpiperazine, 1,4-phenylene diacrylate, 1,5-pentanediol dimethacrylate, 1,6-hexanediol diacrylate, 1,6-hexanediol dimethacrylate, 1,9-nonanediol dimethacrylate, 2,2-bis(4-methacryloxyphenyl) propane, 2,2-bis[4-(2-acryloxyethoxy)phenyl]propane, 2,2-bis[4-(2-hydroxy-3-methacryloxypropoxy)phenyl]propane, 2,2-dimethylpropanediol dimethacrylate, diethylene glycol diacrylate, diethylene glycol dimethacrylate, dipropylene glycol dimethacrylate, ethylene glycol diacrylate, ethylene glycol dimethacrylate, ethylene glycol dimethacrylate, ethylene glycol dimethacrylate, N,N' ethylene bisacrylamide, N,N'-methylenebisacrylamide, N,N'-hexamethylenebisacrylamide, N,N-diallylacrylamide, tetraethylene glycol dimethacrylate, trans-1,4-cyclohexanediol dimethacrylate, triethylene glycol diacrylate, triethylene glycol dimethacrylate, triethylene glycol dimethacrylate, 1,1,1-trimethylolpropane triacrylate, 1,1,1-trimethylolpropane trimethacrylate, dipentaerythritol pentaacrylate, pentaerythritol tetraacrylate, pentaerythritol triacrylate, poly(ethylene glycol) diacrylate, and poly(ethylene glycol) dimethacrylate.

In one instance, the thickness of the polymer encapsulation defines the amount of the polymer loading on the pigment and affects the pigment-to-binder (P/B) ratio of the final coating. In one example, the disclosed coating system has a high P/B ratio. Since the pigments are evenly encapsulated in the polymers, the disclosed coating system can be prepared with a much higher P/B ratio than that of conventional paint/ink systems. In this instance, the coating system can be prepared with a P/B ratio of up to 10, as compared to conventional paints/inks, which have P/B ratios that are typically less than 1. For example, for paints made from Silberline Sparkle Silver Premium® 695, which is an aluminum pigment of average particle size of 12 µm, conventional paints/inks have typical P/B ratios of less than 1, whereas the disclosed coating system can be prepared with a P/B ratio of 5 or higher.

Furthermore, to ensure proper film formation and good adhesion of the coating, the polymer chains in the encapsulation should be of reasonable length and have certain flexibility so that the rearrangement of polymer chains will provide enough physical entanglement and/or expose enough chemical reaction sites to the pigments or the polymer chains from other coated pigment encapsulations. The term "flexibility" herein means that the polymer chains of the polymer coating can readily rearrange their configuration such that the polymer chains can follow the surfaces of other coated pigments and thereby increase the contact areas between the coating surfaces.

In another instance, the polymer chains are attached to the surface of the substrates so as to provide robustness and stability of the coating. The term "robustness and stability" herein means the survivability of the coated substrates under circulation test, repeated solvent wash and typical reaction conditions. In these instances, the polymer chains have the flexibility to maximize their contact with color pigments and greatly enhance the adhesion between the color pigments and the surfaces of the coated substrates.

In one embodiment of the disclosed coating system, the coating system includes a plurality of the coated pigments 10 and a solvent or solvent mixture only. A coating system of this embodiment can be prepared simply by dispersing the plurality of coated pigments 10 in a solvent or a solvent mixture. The amount of the coated pigments in the coating system can be from 10% to 70%, and the amount of the solvent in the coating system can range from 25% to 85%.

In one example, the solvent or solvent mixture utilized is a good solvent of the polymer segments on surfaces of the encapsulation and as such, prevents the collapse of polymer chains and pigment particles from agglomeration. The solvent or solvent mixture used in the disclosed colored system can be water, lower alcohols, hydrocarbons, ethers, esters, ketones, glycol ethers, pyrrolidones, sulfoxides, and mixtures thereof. Examples of a solvent that can be used include butanol, ethyl acetate, butyl acetate, xylene, toluene, propylene glycol monomethyl ether, propylene glycol monomethyl ether acetate, N-methylpyrrolidone and methyl ethyl ketone.

In yet another embodiment, the plurality of coated pigments 10 can be dispersed in systems conventionally used in the art of paints and inks to achieve optimal adhesion and/or reduce the amount of external resin required in the formulation. In this embodiment, the composition of the polymer encapsulation can be adjusted to enhance the dispersion of the pigments, promote adhesion between the pigments and the rest of the coating, and/or provide barrier function to protect pigments.

Without being bound to theory, the mechanical properties of the coating film can originate from the physical entanglement of the polymer chains of different coated pigments 10. In one occurrence, the film integrity is further strengthened by introducing reactive sites on the encapsulation 14 and the formation of cross-linked networks after the application of coated system to a substrate. Similarly, the adhesion between the coating film and the coated pigment can be of chemical or physical origin.

The reduction of binder in the final coating also affects the aesthetics of the final coating products. In another occurrence, increased coated pigment loading in the coating system can lead to chroma or opacity enhancement of the final coating. For effect pigments, it is known that excessive resin in paint/ink will disrupt orientation of pigment. In one example, since the coating system can be formed with a high P/B ratio and the coated pigments are evenly embedded in the polymer encapsulation, the final orientation of the coated pigments, and therefore the aesthetics of the coating, can be greatly improved as compared to conventional methods.

The polymer encapsulation also can be designed to provide the coated pigments with superior stability in the coating systems and in the film that has been formed on a substrate. For example, Al pigments are susceptible to the attack of water, which can degrade Al and generate hydrogen gas that can impose hazards during shipping and storage. In one example, incorporation of a hydrophobic coating on an aluminum pigment can effectively retard the penetration of water to the surface of Al flakes and thereby enhance the stability of the disclosed coating system. For the same reason, the final coating system can have better water resistance as compared to a conventional coating system made from pigments without polymer encapsulation.

Further, conventional paints/inks typically require certain viscosity criteria that need to be met prior to application. For example, in ink applications, the amount of pigment loading is limited by the viscosity of the ink mixtures. Excessive pigment loadings often result in increased viscosity and reduced printability. In resin-less inks, due to the high pigment to binder ratio, significant amount of pigments can be dispersed in the solvent without significantly increasing the ink viscosity. In one example, the disclosed coating system does not require a viscosity criteria. In one instance, the coating system can be applied in low viscosity. In this instance, since the coating system includes a lower percentage of resin as compared to conventional paints/inks, the disclosed coating system can solidify in a much shorter period of time when applied onto a substrate as compared to that of conventional paints/inks.

Another advantage is that since the resin-less paints/inks contain relatively small amounts of resin as compared to conventional coating systems, the resin-less coating can be dried in a much shorter period of time than conventional coating systems.

Yet another advantage is that because no external resin or no dispersant is required in the disclosed coating system, the disclosed system allows great ease during the formulation process. For instance, the coated pigments 10 can be stored in a slurry form. Bulk solvents can be added immediately prior to the application of the coating system.

The resin less system can be applied using standard coating/printing methods. Application methods for the resin-less paint include, but are not limited to, spray and dip coating. Application methods for the resin-less ink include, but are not limited to, gravure, flexo and offset printing.

In one embodiment of an article, the article includes a coating the contains the disclosed coating system.

EXAMPLES

Example 1

Preparation of Polystyrene Coated Al Pigment 480 g aluminum paste (Silberline Sparkle Silver® Premium 695, 75.28% nonvolatile), 1200 mL toluene, and 3 mL 3-(trimethoxysilylpropyl)-2-bromo-2-methylpropionate were added to a 2 L reaction flask equipped with a mechanic stirrer and a condenser. The reaction mixture was heated up and was kept under reflux for 24 hours. Once the reaction time was complete, the mixture was cooled down to room temperature. The flakes were vacuum filtered. Two washes of toluene were applied.

32.3 g initiator modified Al paste (containing 20 g of nonvolatile), 0.423 g CuBr, 200 mL Styrene, and 190 mL PM Acetate were added to a 500 mL reaction flask equipped with a mechanical stirrer and a heating mantle: The solution was degassed with nitrogen and heated to 80° C. under constant stirring. In a separated flask, pentamethyldiethylenetriamine (PMDETA) was degassed with nitrogen for 30 min. Then 0.83 mL of degassed PMDETA was transferred to the reaction flask with a nitrogen purged syringe. After 4 hours of polymerization, the reaction was stopped. The pigments were purified with centrifugation. Thermal gravimetric analysis confirmed polymer composed 15.86% of the dried pigments. The pigments were stored as wet paste in PM acetate.

Example 2

Resin-Less Paint of Polystyrene Coated Al from Example 1

Resin-less paint of pigment made in Example 1 was prepared by diluting wet paste with PM acetate. The final paint has pigment weight concentration of 10.1%. Paint was siphon sprayed onto the plastic panel of polystyrene, poly(methyl methacrylate) and acrylonitrile butadiene styrene (ABS). The sprayed panel was further dried in oven.

Example 3

Preparation of poly(methyl methacrylate) Coated Al Pigment 4.8 kg aluminum paste (Silberline Sparkle Silver® Premium 695, 75.68% nonvolatile), 12 L PM acetate, and 16 mL 3-(trimethoxysilylpropyl)-2-bromo-2-methylpropionate were added to a 20 L reaction flask equipped with a mechanic stirrer and a condenser. The reaction mixture was heated up and was kept under reflux for 6 hours. Once the reaction time was complete, the mixture was cooled down to room temperature. The flakes were vacuum filtered. Two washes of PM acetate were applied.

61.6 g initiator modified Al paste (containing 40 g of nonvolatile), 0.106 g CuBr, 200 mL methyl methacrylate, and 180 mL PM Acetate were added to a 500 mL reaction flask equipped with a mechanical stirrer and a heating mantle: The solution was degassed with argon and heated to 80° C. under constant stirring. In a separated flask, pentamethyldiethylenetriamine (PMDETA) was degassed with argon for 30 min. Then 0.16 mL of degassed PMDETA was transferred to the reaction flask with a argon purged syringe. After 4 hours of polymerization, the reaction was stopped. The pigments were purified with centrifugation. Thermal gravimetric analysis confirmed polymer composed 20.19% of the dried pigments. The pigments were stored as wet paste in PM acetate.

Example 4

Resin-Less Paint of poly(methyl methacrylate) Coated Al from Example 3

Resin-less paint of pigment made in Example 3 was prepared by diluting the wet paste with PM acetate. The final paint has pigment weight concentration of 5.8%. Paint was siphon sprayed onto the plastic panel of poly(methyl methacrylate) and ABS. The sprayed panel was further dried in oven.

Example 5

Article Including the Resin-Less System

Figure 2:
FIG. 2 shows the disclosed coating system applied on a plastic of a) poly(methyl methacrylate), b) acrylonitrile butadiene styrene and c) polystyrene.

The resin-less paint prepared in accordance with Example 4 was applied onto (a) poly(methyl methacrylate), (b) acrylonitrile butadiene styrene and (c) polystyrene panels. The coatings were formed via siphon spray of the resin-less paints. The results are shown in FIG. 2.

Example 6

Cross-Hatch Adhesion Test

Figure 3:
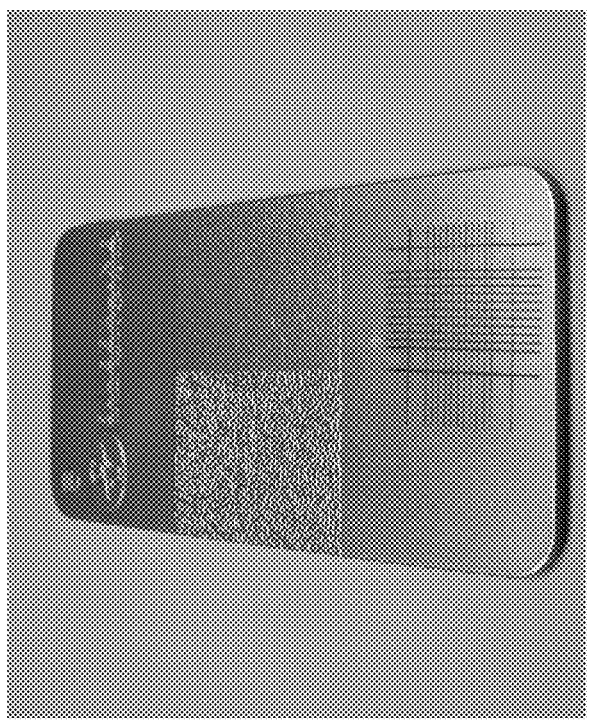
FIG. 3 shows the results of a cross-hatch adhesion test of the resin-less coating of polystyrene coated Silberline Sparkle Silver® Premium 695.

Cross-hatch adhesion test of the coating in Example 4 was conducted in accordance with ASTM D3359 standards. The results are shown in FIG. 3. As shown in FIG. 3, the coating prepared with the disclosed method can provide good performance in a standard cross-hatch adhesion test.

Example 7

Scanning Electron Microscopy of the Resin-Less Coating

The resin-less paint coated poly(methyl methacrylate) panel in Example 5 was analyzed with scanning electron microscopy. The results are shown in FIG. 4. FIG. 4 shows superior orientation of the pigments, which allows superior aesthetics of the coating.

While the disclosed coated pigments and methods have been described in conjunction with a preferred embodiment, it will be apparent to one skilled in the art that other objects and refinements of the disclosed coated pigments and methods may be made within the purview and scope of the disclosure.

The disclosure, in its various aspects and disclosed forms, is well adapted to the attainment of the stated objects and advantages of others. The disclosed details are not to be taken as limitations on the claims.

The invention claimed is:

1. A coating system, comprising:
   a plurality of coated pigments; and
   a liquid carrier, wherein the plurality of coated pigments are dispersed in the liquid carrier,
   wherein each of the coated pigments includes
      a pigment having a surface, and
      a coating surrounding the pigment, the coating including polymer chains, the polymer chains surrounding the surface of the pigment and being attached to the surface of the pigment, and
   wherein the polymer chains of the plurality of the coated pigments are present in an amount sufficient to form a film that adheres to a substrate such that the coated pigments are physically or chemically bonded to the substrate when the coating system is applied onto the substrate and the liquid carrier is removed by evaporation, and
   wherein the coating system does not include any additional dispersants and resins other than those that are attached to the surface of the pigments.

2. The coating system of claim 1, wherein the coating has at least one layer, the at least one layer includes polymer chains, and a thickness of the coating varies less than 15% of an average thickness of the coating.

3. The coating system of claim 1, wherein the coating has a plurality of layers, each layer including the polymer chains, and a thickness of the coating varies less than 15% of an average thickness of the coating.

4. The coating system of claim 1, wherein the pigment includes at least one selected from the group consisting of metal oxides, metal oxide encapsulated materials, silica, borosilica, silica coated materials, mica, glass, iron and aluminum.

5. The coating system of claim 1, wherein the coating includes an inner passivation layer and an outer dispersion layer.

6. The coating system of claim 1, wherein the coating includes inorganic and organic colorants.

7. The coating system of claim 1, wherein the coating includes inter-chain cross-links.

8. The coating system claim 1, wherein the liquid carrier is at least one selected from the group consisting of water, lower alcohols, hydrocarbons, ethers, esters, ketones, glycol ethers, pyrrolidones and sulfoxides.

9. The coating system claim 1, wherein the coating system is an ink or paint system.

10. The coating system of claim 1, wherein the pigment-to-binder ratio is between 1 to 10.

11. The coating system of claim 1, wherein the substrate is plastic or metal.

12. A method of producing the coating system of claim 1, consisting of:
mixing the plurality of coated pigments with the liquid carrier.

13. An article comprising:
a coating that comprises the coating system of claim 1.

14. A method, comprising:
applying the coating system of claim 1 onto a substrate.

15. The coating system of claim 1, wherein a thickness of the coating in each of the coated pigments varies less than 15% of an average thickness of the coating.

16. The coating system of claim 1, wherein the polymer chains are polymers or copolymers of at least one of acrylonitrile, styrene, divinylbenzene, 4-methylstyrene, 3-methylstyrene, 2-methylstyrene, 4-vinylanisole, 4-fluorostyrene, 2-fluorostyrene, 3-fluorostyrene, 4-chloromethylstyrene, 4-(tert-butyl)styrene, 3-chlorostyrene, methyl methacrylate, methyl acrylate, ethyl methacrylate, ethyl acrylate, n-propyl acrylate, n-propyl methacrylate, iso-propyl methacrylate, iso-propyl acrylate, n-butyl acrylate, n-butyl methacrylate, sec-butyl acrylate, sec-butyl methacrylate, tert-butyl acrylate, tert-butyl methacrylate, tert-amyl methacrylate, n-hexyl acrylate, n-octyl methacrylate, 2-ethylhexyl acrylate, n-decyl methacrylate, iso-decyl acrylate, iso-decyl methacrylate, undecyl methacrylate, n-dodecyl acrylate, n-dodecyl methacrylate, 1-hexadecyl methacrylate, stearyl acrylate, stearyl methacrylate, cyclohexyl acrylate, cyclohexyl methacrylate, 3,3,5-trimethylcyclohexyl methacrylate, benzyl acrylate, benzyl methacrylate, pentabromophenyl acrylate, pentabromophenyl methacrylate, pentafluorophenyl acrylate, pentafluorophenyl methacrylate, phenyl acrylate, phenyl methacrylate, 1,1,1,3,3,3-hexafluoroisopropyl acrylate, 1H,1H,2H,2H-heptadecafluorodecyl acrylate, 1H,1H,2H,2H-heptadecafluorodecyl methacrylate, 1H,1H,3H-hexafluorobutyl acrylate, 1H,1H,3H-hexafluorobutyl methacrylate, 1H,1H,3H-tetrafluoropropyl methacrylate, 1H,1H,5H-octafluoropentyl acrylate, 1H,1H,5H-octafluoropentyl methacrylate, 1H,1H,7H-dodecafluoroheptyl methacrylate, 1H,1H-heptafluorobutyl acrylate, 2,2,2-trifluoroethyl acrylate, 2,2,2-trifluoroethyl methacrylate, hexafluoro-iso-propyl methacrylate, pentafluorophenyl acrylate, pentafluorophenyl methacrylate, methacrylamide, acrylamides, 4-vinyl pyridine, N,N-dimethylaminoethyl methacrylate, N,N-diethylaminoethyl methacrylate, glycidyl methacrylate, 2-hydroxyethyl acrylate, and 2-hydroxyethyl methacrylate, glycidyl acrylate, 4-vinylaniline, 3-vinylaniline, N-iso-propylacrylamide, N,N-diethylacrylamide, N,N-dimethylacrylamide, poly(ethylene glycol) methacrylate, poly(ethylene glycol) acrylate, poly(ethylene glycol) methyl ether methacrylate, poly(ethylene glycol) ethyl ether methacrylate, poly(ethylene glycol) methyl ether acrylate, 1,10-decanediol dimethacrylate, 1,3-butanediol dimethacrylate, 1,4-butanediol diacrylate, 1,4-butanediol dimethacrylate, 1,4-diacryloylpiperazine, 1,4-phenylene diacrylate, 1,5-pentanediol dimethacrylate, 1,6-hexanediol diacrylate, 1,6-hexanediol dimethacrylate, 1,9-nonanediol dimethacrylate, 2,2-bis(4-methacryloxyphenyl)propane, 2,2-bis[4-(2-acryloxyethoxy)phenyl]propane, 2,2-bis[4-(2-hydroxy-3-methacryloxypropoxy)phenyl]propane, 2,2-dimethylpropanediol dimethacrylate, diethylene glycol diacrylate, diethylene glycol dimethacrylate, dipropylene glycol dimethacrylate, ethylene glycol diacrylate, ethylene glycol dimethacrylate, ethylene glycol dimethacrylate, ethylene glycol dimethacrylate, N,N' ethylene bisacrylamide, N,N'-methylenebisacrylamide, N,N'-hexamethylenebisacrylamide, N,N-diallylacrylamide, tetraethylene glycol dimethacrylate, trans-1,4-cyclohexanediol dimethacrylate, triethylene glycol diacrylate, triethylene glycol dimethacrylate, triethylene glycol dimethacrylate, 1,1,1-trimethylolpropane triacrylate, 1,1,1-trimethylolpropane trimethacrylate, dipentaerythritol pentaacrylate, pentaerythritol tetraacrylate, pentaerythritol triacrylate, poly(ethylene glycol) diacrylate, and poly(ethylene glycol) dimethacrylate.

17. The coating system claim 1, wherein the liquid carrier is at least one selected from the group consisting of butanol, ethyl acetate, butyl acetate, xylene, toluene, propylene glycol monomethyl ether, propylene glycol monomethyl ether acetate, N-methylpyrrolidone and methyl ethyl ketone.

* * * * *